United States Patent
Heiskanen et al.

(10) Patent No.: US 9,365,978 B2
(45) Date of Patent: Jun. 14, 2016

(54) PROCESS FOR PRODUCING A DISPERSION COMPRISING NANOPARTICLES AND A DISPERSION PRODUCED ACCORDING TO THE PROCESS

(71) Applicant: Stora Enso OYJ, Helsinki (FI)

(72) Inventors: Isto Heiskanen, Imatra (FI); Lars Axrup, Hammaro (SE); Mari-Ann Norborg, Karlstad (SE); Isabel Knoos, Saffle (SE)

(73) Assignee: Stora Enso, OYJ, Helsinki (FI)

( * ) Notice: Subject to any disclaimer, the term of this patent is extended or adjusted under 35 U.S.C. 154(b) by 99 days.

(21) Appl. No.: 14/354,357

(22) PCT Filed: Oct. 25, 2012

(86) PCT No.: PCT/IB2012/055866
§ 371 (c)(1),
(2) Date: Apr. 25, 2014

(87) PCT Pub. No.: WO2013/061266
PCT Pub. Date: May 2, 2013

(65) Prior Publication Data
US 2014/0302336 A1    Oct. 9, 2014

(30) Foreign Application Priority Data
Oct. 26, 2011   (SE) ...................................... 1150997

(51) Int. Cl.
| | | |
|---|---|---|
| *D21H 19/34* | (2006.01) | |
| *C08J 3/03* | (2006.01) | |
| *C08J 3/215* | (2006.01) | |
| *C09D 101/02* | (2006.01) | |
| *C08L 1/02* | (2006.01) | |
| *D21C 9/00* | (2006.01) | |
| *D21H 11/18* | (2006.01) | |
| *D21H 15/02* | (2006.01) | |
| *D21H 19/40* | (2006.01) | |
| *D21H 21/16* | (2006.01) | |
| *C08J 5/00* | (2006.01) | |
| *D21H 17/25* | (2006.01) | |
| *B82Y 30/00* | (2011.01) | |

(52) U.S. Cl.
CPC ............... *D21H 19/34* (2013.01); *B82Y 30/00* (2013.01); *C08J 3/03* (2013.01); *C08J 3/215* (2013.01); *C08J 5/005* (2013.01); *C08L 1/02* (2013.01); *C09D 101/02* (2013.01); *D21C 9/00* (2013.01); *D21H 11/18* (2013.01); *D21H 15/02* (2013.01); *D21H 17/25* (2013.01); *D21H 19/40* (2013.01); *D21H 21/16* (2013.01); *C08J 2301/02* (2013.01); *C08L 2205/16* (2013.01); *Y10T 428/31982* (2015.04)

(58) Field of Classification Search
CPC ....... D21H 19/34; D21H 17/25; D21H 11/18; D21H 15/02; D21H 19/40; D21H 21/16; C08J 3/03; C08J 3/215; C08J 5/005; C08J 2301/02; C08L 1/02; C08L 2205/16; C09D 101/02; D21C 9/00; B82Y 30/00; Y10T 428/31982
USPC ...................... 428/535; 106/204.3; 162/157.6
See application file for complete search history.

(56) References Cited

U.S. PATENT DOCUMENTS

| | | | |
|---|---|---|---|
| 4,341,807 A * | 7/1982 | Turbak et al. | ................. 426/570 |
| 4,510,020 A | 4/1985 | Green et al. | |
| 5,731,080 A * | 3/1998 | Cousin et al. | ................. 428/372 |
| 5,964,983 A * | 10/1999 | Dinand et al. | ................... 162/27 |
| 6,183,596 B1 | 2/2001 | Matsuda et al. | |
| 6,541,627 B1 * | 4/2003 | Ono et al. | ........................ 536/56 |
| 2010/0233468 A1 * | 9/2010 | Ioelovich et al. | ............. 428/326 |

FOREIGN PATENT DOCUMENTS

| | | |
|---|---|---|
| EP | 2236664 | * 10/2010 |
| WO | 9318111 | 9/1993 |
| WO | WO9318111 | * 9/1993 |
| WO | 03033815 | 4/2003 |
| WO | 2008121069 | 10/2008 |
| WO | 2010115785 | 10/2010 |
| WO | WO2010115785 | * 10/2010 |
| WO | 2010131016 | 11/2010 |

OTHER PUBLICATIONS

Henriksson et al., "Cellulose Nanopaper Structures of High Toughness," Biomacromolecules (2008) vol. 9, pp. 1579-1585.
International-Type Search Report of the ISA/SE, mailed Apr. 27, 2012.
Second Office Action issued by the Swedish Patent Office, dated Jul. 1, 2013 (translation not available).

* cited by examiner

*Primary Examiner* — Leszek Kiliman
(74) *Attorney, Agent, or Firm* — Greer, Burns & Crain, LTD

(57) ABSTRACT

The present invention relates to a process for producing a dispersion comprising microfibrillated cellulose and nanoparticles wherein the process comprises the steps; providing a slurry comprising pre-treated cellulose fibers, adding nanoparticles to the slurry and treating the slurry by mechanical disintegration so that a dispersion comprising microfibrillated cellulose is formed in which the nanoparticles are being adsorbed to the surface of the microfibrillated cellulose and/or being adsorbed into the microfibrillated cellulose. The invention further relates to a dispersion produced according to the process, a paper or board product being coated with a coating comprising said dispersion and a paper or board product being produced from said dispersion as well as a composite comprising said dispersion.

19 Claims, No Drawings

PROCESS FOR PRODUCING A DISPERSION COMPRISING NANOPARTICLES AND A DISPERSION PRODUCED ACCORDING TO THE PROCESS

This application is a U.S. National Phase under 35 U.S.C. §371 of International Application No. PCT/IB2012/055866, filed Oct. 25, 2012, which claims priority under 35 U.S.C. §§119 and 365 to Swedish Application No. 1150997-3, filed Oct. 26, 2011.

FIELD OF INVENTION

The present invention relates to a process for producing a dispersion comprising microfibrillated cellulose and nanoparticles. The invention further relates to a dispersion produced according to the process, a paper or board product being coated with a coating comprising said dispersion and a paper or board product being produced from said dispersion as well as a composite comprising said dispersion. By the present invention it is possible to produce a very stable dispersion comprising nanoparticles and microfibrillated cellulose.

BACKGROUND

During production of paper or board products there is often a desire to add nanoparticles either to the furnish of the paper or board or to the surface of the formed paper or board product. The nanoparticles are often added in order to reduce production cost and/or in order to improve the properties, such as printing properties, of the finished paper or board product.

Nanoparticles are also used in many other applications, such as production of composites in which the nanoparticles often is added in order to reduce the weight and increase elastic modulus of the composites.

The problem when working with dispersions or slurries comprising nanoparticles is that they are not stable and the nanoparticles easily form aggregates which not as reactive as nanoparticles in free form. Furthermore, dispersions comprising nanomaterial often have a problem with dusting and it could also be hazardous to handle the dispersions comprising nanoparticles since they e.g. are being adsorbed by the skin. Dried dispersions comprising microfibrillated cellulose often also has problems with dusting.

There is thus a need for an improved process for producing a stable dispersion comprising nanoparticles with improved properties.

SUMMARY OF INVENTION

The object of the present invention is to provide a process that in a very efficient and safe way is able to produce a stable dispersion comprising nanoparticles.

Another object of the present invention is to provide a paper or board product coated with a coating comprising said stable dispersion.

These objects, as well as other objects and advantages, are achieved by the process according to claim 1. The present invention relates to a process for producing a dispersion comprising microfibrillated cellulose and nanoparticles wherein the process comprises the steps; providing a slurry comprising pre-treated cellulose fibers, adding nanoparticles to the slurry and treating the slurry by mechanical disintegration so that a dispersion comprising microfibrillated cellulose is formed in which the nanoparticles are being absorbed to the surface of the microfibrillated cellulose and/or being absorbed into the microfibrillated cellulose. By treating a slurry comprising pre-treated cellulose fibers and nanoparticles by mechanical disintegration it is possible to produce a much more stable dispersion at the same time as the dispersion also has other improved properties, such as decreased dusting problems.

The mechanical disintegration is preferably done in a pressure homogenizator. It has been shown that by using a pressure homogenizator it is possible to produce microfibrillated cellulose with more open areas and at the same time dispergate the nanoparticles of the dispersion in a very efficient way.

The pressure used in the pressure homogenizator is preferably between 500-4000 Bar, more preferably between 1000-2000 Bar.

The nanoparticles are preferably nanoparticles of bentonite, titanium dioxide, zinc oxide, silver, copper oxide, iron oxide, silica, calcium carbonate, such as nano-precipitated calcium carbonate (PCC) and/or carbon nanotubes.

The ratio between the microfibrillated cellulose and nanoparticles of the dispersion is preferably between 10:90 to 90:10. Depending on the end use and on what kind of microfibrillated cellulose and nanoparticles the dispersion comprises, the ratio can vary.

It is preferred that a majority of the nanoparticles of the dispersion, preferably at least 50%, are being absorbed on the surface of or into the microfibrillated cellulose. In this way the amount of free nanoparticles in the dispersion is limited and the tendency for the nanoparticles to form unreactive nano-aggregates is reduced.

The dry content of the slurry to be treated by mechanical disintegration is preferably between 1-30% by weight of fibers. The dry content of the slurry depends on the nanoparticles used, what kind of MFC used as well as what kind of apparatus used for the mechanical disintegration.

The dry content of the dispersion after it has been treated by the mechanical disintegration is preferably above 50% by weight of fibers. The dispersion is preferably dewatered after the mechanical disintegration in order to increase the dry content. By increasing the dry content, transportation of the dispersion to other sites can be done a more efficient way. Furthermore, it has been shown that by increasing the dry content of the dispersion the stability is even further increased.

The process may further comprise washing of the dispersion after the mechanical disintegration. In this way it is possible to remove any free nanoparticles of the dispersion. The nanoparticles being removed in the washing can be recirculated back into the process and thus be reused.

The invention further relates to a dispersion being produced according to the process described above. It has been shown that the dispersion being produced is less hazardous and has increased stability at the same time as it has reduced dusting tendencies.

The dispersion preferably has a dry content above 50% by weight of fibers. Different nanoparticles gives the dispersion varying flow properties etc, therefore depending on the nanoparticles used, the maximum dry content of the dispersion varies. Furthermore, it also depends on what kind of MFC used as well as what kind of apparatus used for the mechanical disintegration.

The majority of the nanoparticles of the dispersion, preferably at least 50% of the nanoparticles, are preferably being adsorbed on the surface of or into the microfibrillated cellulose, i.e. the amount of free nanoparticles in the dispersion is quite low. In this way the dispersion will be more stable as well as it is being less hazardous to handle.

It is also possible that the dispersion comprises substantially no free nanoparticles. By removing any free nanoparticles, preferably by washing of the dispersion after the dispersion has been mechanical disintegrated, it is possible to remove all or substantially all free nanoparticles from the dispersion, i.e. the dispersion comprises no or only substantially no free nanoparticles.

The invention further relates to a paper or board product being coated with a coating comprising the dispersion as described above. By coating a paper or paperboard with the mentioned dispersion it is possible to provide the paper or paperboard with an improved coating. If the dispersion comprises MFC and bentonite nanoparticles it has been shown that a substrate being coated with such dispersions is provided with very good grease resistance, i.e. a barrier against grease is created. If the coating color being coated to the paper or paperboard surface also comprises at least one polymer, it has been shown that the paper or paperboard can be provided with a very good barrier coating, especially a barrier against liquids.

The invention also relates to a paper or board being produced from the dispersion described above. It is thus possible to produce a paper or board product from the dispersion. The paper or board is thus produced by adding the dispersion comprising microfibrillated cellulose and nanoparticles to a wire in order to form a web. The web is thereafter treated in known manners in order to form the paper or board product.

The invention further relates to a composite comprising the dispersion described above. By adding the dispersion comprising microfibrillated cellulose and nanoparticles to a composite it is possible to produce a composite with a high amount of nanoparticles in an easy way. This is due to that the dispersion is very stable and it is thus easy to use the dispersion as an additive to composites.

DETAILED DESCRIPTION OF THE INVENTION

The present invention relates to a process for producing a dispersion comprising nanoparticles and microfibrillated cellulose in which the nanoparticles have been absorbed to the surface or into the microfibrillated cellulose. The dispersion is produced by treating a slurry comprising pre-treated cellulosic fibers and nanoparticles, by mechanical disintegration, preferably in a pressure homogenizer, which will make sure that microfibrillated cellulose with a high amount of open surface is formed at the same time as the nanoparticles are homogenized and being prevented from forming nanoparticle-aggregates. By both increasing the amount of open surface of the formed microfibrillated cellulose and preventing the nanoparticles to form nano-aggregates, it is possible for the nanoparticles to absorb to a larger extent to the open surfaces of the microfibrillated cellulose. It has also been shown that by treating a slurry comprising nanoparticles and pre-treated cellulosic fibers in a pressure homogenizer the nanoparticles will not only absorb on the surface of the MFC but also into the MFC. In this way the produced dispersion will be very stable and less nano-aggregates will be formed. Due to the increased stability the dispersion will be easier to handle and it is possible to transport the dispersion to different locations in an easy way.

Furthermore, it has been shown that the dispersion according to the invention has less dusting problems even at high dry contents or even when dried. It has also been shown that the skin absorption of the dispersion is reduced which makes it less hazardous to handle. It is thus possible to handle the dispersion with decreased safety restrictions which makes it a more attractive product, seeing both to improved working environment as well as it will be more economical beneficial.

The mechanical disintegration can be done in many different kind of mechanical treatment apparatus, for example refiners or grinders such as masuko grinders. However, it is preferred to use a pressure homogenizer which in a very efficient way both will produce microfibrillated cellulose fibers from pre-treated fibers as well as homogenize the nanoparticles. A pressure homogenizer creates high shear forces which will disintegrate both the fibers and the nanoparticles. A high pressure is used during mechanical disintegration, and the pressure is preferably between 500-4000 Bar, preferably between 1000-2000 Bar. The optimal pressure is often around 1500 Bar. The pressure needed depends on the material being treated. However, too high pressures are often not beneficial to use since the wear of the equipment will be too high. One example of a specific pressure homogenizer is the so called microfluidizer.

With nanoparticles it is meant particles having any external dimension in the nanoscale or having internal structure or surface structure in the nanoscale. With nanoscale it is meant the size range from approximately 1 nm to 100 nm. Examples of nanoparticles that can be used are nanoparticles of bentonite, of titanium dioxide, zinc oxide, silver, copper oxide, iron oxide, silica, calcium carbonate, such as nano-precipitated calcium carbonate (PCC) and/or carbon nanotubes. Nanoscaled titanium dioxide may give a very effective UV barrier, which means that the MFC having absorbed or incorporated nanoparticles of titanium dioxide will have UV barrier properties. It is also possible to coat the titanium dioxide nanoparticles with aluminumoxide (Al2O3) in order to reduce the photoactivity which will give the titanium oxide the function as white pigments. Carbon nanotubes is typically used in composite materials and the MFC having absorbed or incorporated nanoparticles of carbon nanotubes will have improved conductivity, antistatic properties, increased toughness and fire resistance. The increased toughness is a very interesting property for use in board products being used as packages. Nanosilica may improve the ink-jet printing properties of a paper or board product being coated with a dispersion comprising MFC and nanosilica.

The pre-treated cellulosic fibers can be fibers of any kind of wood fibers, such as hardwood fibers, softwood fibers and/or agricultural fibers. Possible pre-treatments may be mechanical treatment, such as disintegration, enzymatic treatment, carboxy methylation, TEMPO oxidation, CMC grafting, chemical swelling, acid hydrolysis or other methods which will facilitate the formation of microfibrillated cellulose. Preferably the pre-treatment is an enzymatic treatment. The pre-treatment may be done in more than one step. The pre-treated cellulosic fibers may also comprise cellulosic fibrils. Furthermore, it is also possible to add microfibrillated cellulose to the pre-treated fibers before mechanical disintegration.

The microfibrillated cellulose (MFC) mentioned is also known as nanocellulose. It is a material typically made from wood cellulose fibers, both from hardwood or softwood fibers. It can also be made from microbial sources, agricultural fibers such as wheat straw pulp, bamboo or other non-wood fiber sources. In microfibrillated cellulose the individual microfibrils have been partly or totally detached from each other. A microfibrillated cellulose fiber is normally very thin (~20 nm) and the length is often between 100 nm to 10 μm. However, the microfibrils may also be longer, for example between 10-200 μm, but lengths even 2000 um can be found due to wide length distribution. Fibers that has been fibrillated and which have microfibrils on the surface and microfibrils that are separated and located in a water phase of a slurry are included in the definition MFC. Furthermore, whiskers are also included in the definition MFC.

By treating a slurry by mechanical disintegration such as in a pressure homogenizer, it has been shown that the amount of nanoparticles in the dispersion can be increased. It is thus possible to produce a dispersion comprising a large amount of nanoparticles. This is due to the formation of new open areas during the mechanical disintegration of the pre-treated cellulosic fibers which gives the nanoparticles new sites to attach to. Furthermore, the mechanical disintegration will prevent formation of nanoparticle aggregates which is not as reactive towards the open sites of the MFC. The majority of the added nanoparticles are absorbed, i.e. they are not present in the liquid phase of the dispersion. It is preferred that at least 50% of the added nanoparticles are absorbed on or into the MFC, more preferably at least 70% and even more preferably at least 80% of the added nanoparticles are absorbed.

It is also possible to remove any unabsorbed nanoparticles from the dispersion. This may either be done by washing the dispersion after the treatment by mechanical disintegration. This may for example be done by washing with e.g. water, by centrifugation of the dispersion and thereafter removing the part of the dispersion comprising the free nanoparticles or by the use of electro-osmosis. The nanoparticles that are being removed from the slurry are preferably returned back to the process in order to reuse the nanoparticles. Free nanoparticles can be disturbing in many different way, they make for example the handling of the dispersion more difficult since free nanoparticles has a risk of adsorbing into the skin or lungs of the person handling it. By removing any free nanoparticles it is thus possible to produce an even safer product.

The ratio between the nanoparticles and the MFC in the dispersion is preferably between 10:90 to 90:10. It is often preferred to try to increase the amount of nanoparticles of the dispersion as much as possible and thus reducing the amount of microfibrillated cellulose. However, depending on what kind of MFC as well as nanoparticles the respective amount varies in order to produce as stable dispersion as possible.

The dry content of the slurry before being treated by mechanical disintegration is preferably between 1-30% by weight of fibers. Depending on the cellulosic fibers used, the nanoparticles used as well as on which equipment is used for the mechanical disintegration, the dry content of the slurry has to be varied. It has been shown that adsorption/absorption of the nanoparticles into the microfibrillated cellulose can be increased by increasing the solids of the slurry either before or during the mechanical disintegration. The solids can be increased by drying the slurry or by subjecting it to other liquid medium reducing methods.

The dry content of the dispersion after being treated in by mechanical disintegration is preferably above 50% by weight of fibers. It is preferred to dewatering the dispersion after mechanical disintegration in order to increase the dry content of the dispersion. It has been shown that higher dry contents will increase the stability of the dispersion as well as it is more economical beneficial to transport a dispersion with high dry content since the amount of water being transported is reduced.

The present invention also relates to a dispersion produced according to the process. The increased stability of the dispersion makes it much easier to handle. It is for example easier to transport the dispersion to customers without changing the properties of the dispersion during transportation. In this way, the handling of the dispersion for the customer is facilitated since it may not be necessary to produce the dispersion on site. Instead the customer can buy a finished dispersion to be used according to their wishes.

The dispersion can be used in many different products. For example as a component in sun lotion, as a component in cleaning and hygiene product, in products comprising nanomaterial reinforced composites such as plastics, sport gears and mobile phones, in fire retardant applications, in order to give friction reduction, as an antimicrobial composite for example clean surfaces, filter papers, packages for sensitive products, in conductive or unconductive surfaces for example batteries and one time electronics, in self-cleaning surfaces, for sunpanels and/or as a component in conductive printing inks.

The present invention further relates to a paper or board product being coated with a coating comprising the dispersion according to the invention. The use of the dispersion in a coating color can provide a paper or board with very good barrier properties. It has been shown that if a dispersion comprising bentonite nanoparticles and MFC is coated to the surface of a paper or board, a very good barrier against grease can be formed. The coating color may also comprise some kind of polymer, and such coating will often give a paper or board product excellent liquid barrier properties. The reason why the dispersion according to the invention will give a paper or board product good barrier properties might be due to that a denser structure is formed on the surface of the product. If nanoparticles with a specific form, such as a blade like structure, is used a physical blocking may also occur. This physical locking means that e.g. the oxygen or the liquid is forced to take a longer way in order to penetrate into the substrate and in this way an improved barrier of the product is formed. Furthermore, the present MFC will both prevent the polymer and the nanoparticles to penetrate too far into the product as well as increase the strength of the barrier layer making it more resistance against mechanical defects. Another advantage with coating the dispersion according to this invention is that the rheology of the coating color will be improved which both improves the runnability of the coating process as well as decreased amount of pinholes or other defects in the coating layer. Furthermore, since the dispersion according to the invention comprises a large amount of nanoparticles which is a particle that will not shrink or change after or during drying, the product will show fewer problems with warping or other defects due to shrinking after drying.

The invention also relates to a paper or board being produced from the dispersion described above. It is thus possible to produce a paper or board product from the dispersion. The paper or board is thus produced by adding the dispersion comprising microfibrillated cellulose and nanoparticles to a wire in order to form a web. The web is thereafter treated in known manners in order to form the paper or board product. It has been shown that it is possible to produce a very good paper product from the dispersion according to the invention. Due to the stability of the dispersion, it is possible to produce a paper product with large amount of nanoparticles.

The invention further relates to a composite comprising the dispersion described above. By adding the dispersion comprising microfibrillated cellulose and nanoparticles to a composite it is possible to produce a composite with a high amount of nanoparticles in an easy way. This is due to that the dispersion is very stable and it is thus easy to use the dispersion as an additive to composites. The composite will thus comprise large amounts of nanoparticles and also some MFC which will give the composite improved properties.

EXAMPLE

A slurry comprising the mixture of pre-treated fibers (enzymatically pre-treated) and bentonite nanoparticles at a ratio of 50:50. The enzyme was a cellulase enzyme, more specifically an endoglucanase (EGII). The dry content of the slurry was 6% by weight. The slurry were pressure homogenized in a microfluidizer at a pressure of 1500 Bar.

The stability of the produced dispersion was thereafter visually detected. After four weeks the dispersion was still stable.

This could be compared to a dispersion comprising only bentonite nanoparticles which tends to sediment during storage and to a dispersion comprising microfibrillated cellulose that tends to "bleed" water when being stored.

Consequently, the dispersion according to the invention is much more stable.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for producing a dispersion comprising microfibrillated cellulose and nanoparticles wherein the process comprises the steps:
   providing a slurry comprising pre-treated cellulosic fibers, wherein the cellulosic fibers have been pre-treated by mechanical treatment, enzymatic treatment, carboxy methylation, TEMPO oxidation, CMC grafting, or acid hydrolysis,
   adding nanoparticles to the slurry and
   treating the slurry by mechanical disintegration so that a dispersion comprising microfibrillated cellulose is formed in which the nanoparticles are adsorbed on a surface of the microfibrillated cellulose or into the microfibrillated cellulose or both.

2. The process according to claim 1 wherein the mechanical disintegration is done in a pressure homogenizer.

3. The process according to claim 2 wherein the pressure used in the pressure homogenizer is between 500-4000 Bar.

4. The process claim 1 wherein the nanoparticles are particles selected from the group consisting of bentonite, titanium dioxide, zinc oxide, silver, copper oxide, iron oxide, silica, calcium carbonate, carbon nanotubes, and mixtures thereof.

5. The process according to claim 1 wherein the ratio between the microfibrillated cellulose and nanoparticles is between 10:90 to 90:10.

6. The process according to claim 1 wherein a majority of the nanoparticles are adsorbed on the surface of or into the microfibrillated cellulose.

7. The process according to claim 1 wherein the dry content of the slurry to be treated by mechanical disintegration is between 1-30% by weight of fibers.

8. The process according to claim 1 wherein the dry content of the dispersion after being treated by mechanical disintegration is above 50% by weight of fibers.

9. The process according to claim 1 wherein the process further comprises washing of the dispersion after the mechanical disintegration.

10. A dispersion being produced according to the process according to claim 1.

11. The dispersion according to claim 10 wherein the dispersion has a dry content of above 50% by weight of fibers.

12. The dispersion according to claim 10 wherein the majority of the nanoparticles are adsorbed on the surface of or into the microfibrillated cellulose.

13. The dispersion according to any one of claim 10 wherein dispersion comprises substantially no free nanoparticles.

14. A paper or board product comprising a coating layer comprising the dispersion according to claim 10.

15. The paper of board product according to claim 14 wherein the coating layer comprises bentonite nanoparticles and MFC and that coating layer forms a barrier against grease on the surface of the paper or paperboard.

16. The paper or paperboard product according to claim 14 wherein the coating further comprises a polymer which forms a barrier on the surface of the paper or paperboard.

17. A paper or board being produced from the dispersion according to claim 10.

18. A composite comprising the dispersion according to claim 10.

19. The process according to claim 1 wherein the calcium carbonate is nano-precipitated calcium carbonate (PCC).

* * * * *